United States Patent [19]

Salsman

[11] Patent Number: 5,281,630
[45] Date of Patent: Jan. 25, 1994

[54] SULFONATED WATER-SOLUBLE OR WATER-DISPERSIBLE POLYESTER RESIN COMPOSITIONS

[75] Inventor: Robert K. Salsman, Conyers, Ga.

[73] Assignee: The Seydel Companies, Atlanta, Ga.

[21] Appl. No.: 809,946

[22] Filed: Dec. 18, 1991

[51] Int. Cl.⁵ .............................................. C08S 11/04
[52] U.S. Cl. .................... 521/48.5; 521/40.5; 521/48; 524/603; 524/605; 525/437
[58] Field of Search ............ 521/40.5, 48.5, 48; 524/603, 605; 525/437

[56] References Cited

U.S. PATENT DOCUMENTS

| | | | |
|---|---|---|---|
| 3,385,811 | 5/1968 | Carrington et al. | 528/171 |
| 3,592,874 | 7/1971 | Reese et al. | |
| 3,655,820 | 4/1972 | Kaupp | 528/176 |
| 3,935,166 | 1/1976 | Kanai et al. | 528/190 |
| 4,291,153 | 9/1981 | Noonan et al. | 528/192 |
| 4,306,056 | 12/1981 | Miyamoto et al. | 528/297 |
| 4,619,987 | 10/1986 | Saiki et al. | 528/274 |
| 4,663,424 | 5/1987 | Stix et al. | 528/182 |
| 4,977,191 | 12/1990 | Salsman | 521/48 |

*Primary Examiner*—John Kight, III
*Assistant Examiner*—T. Mosley
*Attorney, Agent, or Firm*—Cort Flint; Isaac Angres

[57] ABSTRACT

A sulfonated water-soluble or water-dispersible polyester resin composition comprises a prepolymer resin, which prepolymer resin is further reacted with about 0.10 mol to about 0.50 mol of an alpha, beta-ethylenically unsaturated dicarboxylic acid per 100 g of prepolymer resin and a thus-produced resin, terminated by a residue of an alpha,beta-ethylenically unsaturated dicarboxylic acid, is reacted with about 0.5 mol to about 1.5 mol of a sulfite per mol of alpha,beta-ethylenically unsaturated dicarboxylic acid residue to produce a sulfonate-terminated resin. The prepolymer resin is (a) a reaction product of 20-50% by weight of terephthalate polymer, 10-40% by weight of at least one glycol and 5-25% by weight of at least one oxyalkylated polyol, preferably also comprising 20-50% by weight of isophthalic acid or (b) a reaction product of 20-50% by weight of terephthalate polymer, 10-50% by weight of at least one glycol and 20-50% by weight of isophthalic acid.

40 Claims, No Drawings

SULFONATED WATER-SOLUBLE OR WATER-DISPERSIBLE POLYESTER RESIN COMPOSITIONS

DESCRIPTION

1. Technical Field

This invention relates to sulfonated water-soluble or water-dispersible polyester resin compositions, made from virgin or waste terephthalate plastic materials. The products are made by treating a polyester glycolysis product with an alpha,beta-ethylenically unsaturated dicarboxylic acid and then with a sulfite. The products are useful as coatings for fibers, fabrics, paper, carboard and wood and are also useful as adhesives. The products can act as soil release agents for detergents, particularly as soil release agents for polyester fabrics. This invention permits utilization of waste plastic materials, which would otherwise be discarded in landfills or other solid waste disposal facilities.

2. Background Art

Carrington et al. (U.S. Pat. No. 3,385,811) have disclosed making sulfur-modified block copolyesters by melt blending a sulfur-free polyester and sulfur-containing polyester. The sulfur-containing polyester is made by treating an unsaturated polyester, e.g. poly(glycol maleate), with sulfur dioxide, sulfurous acid or a sulfite salt.

Miyamoto et al. (U.S. Pat. No. 4,306,056) have recited producing an oligoester, which is reacted with an unsaturated dibasic acid or its anhydride.

Kaupp (U.S. Pat. No. 3,655,820) has disclosed treating a polyester with maleic acid or maleic anhydride and curing the resulting material with an olefinically-unsaturated compound, such as styrene, an acrylic ester or diallyl phthalate.

Reese et al. (U.S. Pat. No. 3,592,874) have proposed preparing unsaturated polyesters by transesterifying a polyester in the presence of a cobalt salt and further treating the composition with an unsaturated monomer. The product is then esterified with an unsaturated polycarboxylic acid.

Stix et al. (U.S. Pat. No. 4,663,424) have described the preparation of aromatic polyesters, containing dimethylmaleimide end groups.

Salsman (U.S. Pat. No. 4,977,191), herein incorporated by reference, has proposed a process for the glycolysis of polyesters, particularly waste polyester, to produce water-soluble or water-dispersible resins, useful for sizing textile fibers or fabrics.

It is an object of this invention to convert glycolysis products of polyesters to compositions, having very high solubility in water, by converting alcoholic end groups to esters of ethylenically unsaturated dicarboxylic acids and adding a sulfonate function across the double bond.

DISCLOSURE OF INVENTION

In one aspect, this invention relates to a sulfonated water-soluble or water-dispersible polyester resin, comprising a reaction product of 20–50% by weight of waste terephthalate polymer, 10–40% by weight of at least one glycol and 5–25% by weight of at least one oxyalkylated polyol to produce a prepolymer resin, wherein the prepolymer resin is further reacted with about 0.10 mol to about 0.50 mol of an alpha, beta-ethylenically unsaturated dicarboxylic acid per 100 g of prepolymer resin and a thus-produced resin, terminated by a residue of an alpha,beta-ethylenically unsaturated dicarboxylic acid, is reacted with about 0.5 mol to about 1.5 mol of a sulfite per mol of alpha,beta-ethylenically unsaturated dicarboxylic acid residue to produce a sulfonate-terminated resin. Preferred resins also comprise 20–50% by weight of isophthalic acid.

In another aspect, this invention relates to a water-soluble or water-dispersible polyester resin, comprising a reaction product of 20–50% by weight of waste terephthalate polymer, 10–50% by weight of at least one glycol and 20–50% by weight of isophthalic acid to produce a prepolymer resin, wherein the prepolymer resin is further reacted with about 0.10 mol to about 0.50 mol of an alpha, beta-ethylenically unsaturated dicarboxylic acid per 100 g of prepolymer resin and a thus-produced resin, terminated by a residue of an alpha,beta-ethylenically unsaturated dicarboxylic acid is reacted with about 0.5 mol to about 1.5 mol of a sulfite per mol of alpha,beta-ethylenically unsaturated dicarboxylic acid residue to produce a sulfonate-terminated resin.

In another aspect, this invention relates to cardboard, wood, textile fiber, paper, fabric, glass or glass fiber, coated or adhered with the foregoing sulfonated polyester resins.

This invention further relates to detergents, containing the sulfonated soil release agents of this invention.

DETAILED DESCRIPTION

The process for making the sulfonated resins can be represented by the following reactions, wherein polyester—$CH_2OH$ is polyester with a free hydroxyl group at the end of the prepolymer resin, maleic acid ($HOOCCH=CHCOOH$) is a representative alpha,beta-ethylenically unsaturated dicarboxylic acid and sodium sulfite ($Na_2SO_3$) is a representative sulfite:

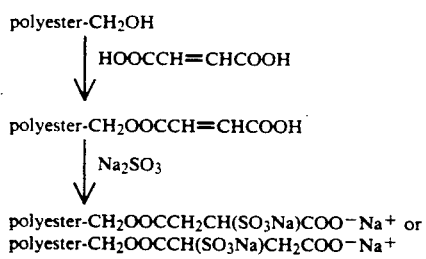

polyester-$CH_2OOCCH_2CH(SO_3Na)COO^-Na^+$ or
polyester-$CH_2OOCCH(SO_3Na)CH_2COO^-Na^+$ In the specification and claims, "thus-produced resin, terminated by a residue of an alpha,beta-unsaturated dicarboxylic acid" is represented by the formula polyester—$CH_2OOCCH=CHCOOH$ when maleic acid or its anhydride is the alpha,beta-ethylenically unsaturated acid.

The prepolymer resins are made from virgin or waste terephthalate polymers, including bottles, sheet material, textile wastes and the like. The waste terephthalate plastics may be bought from recyclers and include, but are not limited to, material identified as "PET rock." For economic reasons, it will be preferred to use waste sources of terephthalates.

The terephthalate polymer can be characterized by the unit formula

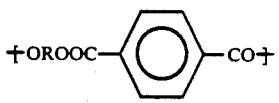

wherein R is the residue of an aliphatic or cycloaliphatic glycol of 2-10 carbons or of an oxygenated glycol of the formula

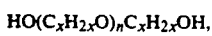

wherein x is an integer from 2-4 and n is 1-10.

Preferably the terephthalate polymer is waste polyethylene terephthalate, polybutylene terephthalate, poly(cyclohexanedimethanol terephthalate) or a mixture thereof.

The glycol with which the terephthalate polymer is reacted can be selected from among a variety of known dihydric alcohols. Preferred glycols include, but are not limited to, ethylene glycol, diethylene glycol, triethylene glycol, cyclohexanedimethanol, propylene glycol, butylene glycol, neopentyl glycol, 1,5-pentanediol, 1,6-hexanediol or mixtures thereof. Most preferably, the glycol is a mixture of diethylene glycol and neopentyl glycol.

The oxyalkylated polyol is derived from any polyol, having three or more alcohol functions. Polyols include glycerol, trimethylolpropane, trimethylolethane, pentaerythritol, erythritol, sorbitol, mannitol, other sugar alcohols or monosaccharides, such as glucose or methyl glucoside. The polyols are oxyalkylated with an alkylene oxide, including, but not limited to, ethylene oxide, propylene oxide, butylene oxide, amylene oxide, etc.

Preferably, the oxyalkylated polyol is glycerol, trimethylolpropane, trimethylolethane, pentaerythritol, erythritol, sorbitol or a monosaccharide, oxyalkylated with 5-30 moles of ethylene oxide, propylene oxide or a mixture thereof, per hydroxyl of the polyol.

The prepolymer polyester resins can further include 3-15% by weight of trimellitic acid or anhydride as well as 1-10% by weight of polyol. Polyols are chosen as above.

The prepolymer polyester resins can be made by heating terephthalate polymer, glycol, oxyalkylated polyol and, optionally, isophthalic acid together in any order until breakdown and reconstruction of a mixed terephthalate-isophthalate ester has occurred. This process normally requires, for acceptable reaction times, temperatures above about 150° C. to the decomposition point of the ester product.

In making the prepolymer polyesters, it is preferred to heat the terephthalate polymer, glycol and oxyalkylated polyol above about 150° C. to partially breakdown the terephthalate and then to heat the thus-produced intermediate with isophthalic acid under similar temperature conditions.

A most preferred prepolymer resin is that obtained by heating terephthalate polymer, glycol and oxyalkylated polyol above about 150° C. to produce an intermediate product, characterized by a 15-minute clear peel, and heating the thus-obtained intermediate product with isophthalic acid at a temperature of at least 150° C.

Prepolymer polyester resins, containing trimellitic acid or trimellitic anhydride, are preferably made by heating an isophthalic acid-containing intermediate with trimellitic acid or trimellitic anhydride. It is preferred to obtain an intermediate, having a 15-minute clear peel, before reaction with isophthalic acid and then with trimellitic acid or anhydride.

Prepolymer resins made from terephthalate polymer, glycol and isophthalic acid are preferably made by heating terephthalate polymer with at least one glycol above about 150° C. to produce an intermediate product, characterized by a 15-minute clear peel, and heating the thus-obtained intermediate product with isophthalic acid at a temperature of at least 150° C. Subsequent reaction with trimellitic acid or trimellitic anhydride is preferred.

Preferred terephthalate feeds are as above. Most preferred feeds are polyethylene terephthalate or poly(cyclohexanedimethanol terephthalate).

Glycols are as recited above. Particularly preferred is a mixture of diethylene glycol and cyclohexanedimethanol.

A preferred prepolymer resin is that comprising a reaction product of 20-50% by weight of polyethylene terephthalate, 10-30% by weight of diethylene glycol, 20-50% by weight of isophthalic acid and 3-15% by weight of trimellitic acid or trimellitic anhydride.

A highly-preferred prepolymer polyester resin comprises a reaction product of 20-50% by weight of polyethylene terephthalate, 10-30% by weight of diethylene glycol, 1-10% by weight of pentaerythritol, 5-25% by weight of oxyalkylated glycerol of 5-30 oxyalkyl units per hydroxyl, 20-50% by weight of isophthalic acid and 3-15% by weight of trimellitic acid or trimellitic anhydride.

The prepolymer polyester resins are usually and preferably made using an ester-interchange catalyst. These catalysts are well known organometallic compounds, particularly compounds of tin or titanium. Preferred catalysts include tetraalkyl titanates, in which the alkyl is of up to 8 carbon atoms, as well as alkyl stannoic acids or dialkyl tin oxides, such as monobutyl stannoic acid or dioctyl tin oxide. Preferred catalysts include monobutyl stannoic acid and tetrapropyl or tetrabutyl titanate, or a mixture thereof.

It will be understood that the prepolymer resins contain free hydroxyl groups, which can react with an alpha,beta-ethylenically unsaturated dicarboxylic acid to produce a resin, terminated by a residue of an alpha,-beta-ethylenically unsaturated dicarboxylic acid. Typical alpha,beta-ethylenically unsaturated dicarboxylic acids include, but are not limited to, maleic acid, itaconic acid, citraconic acid, fumaric acid, mesaconic acid, aconitic acid, anhydrides of corresponding cis-dicarboxylic acids, and mixtures thereof. Maleic acid and maleic anhydride are most preferred.

It has been found that significant improvement in water solubility is observed when the prepolymer resin is reacted with at least 0.10 mol of alpha,beta-ethylenically unsaturated dicarboxylic acid per 100 g of prepolymer resin. More preferably, the prepolymer is reacted with about 0.10 mol to about 0.50 mol of an alpha,beta-ethylenically unsaturated dicarboxylic acid per 100 g of prepolymer resin. Most preferably, the prepolymer is reacted with about 0.25 mol to about 0.50 mol of alpha,beta-ethylenically unsaturated dicarboxylic acid per 100 g of prepolymer resin.

Reaction with the alpha,beta-ethylenically unsaturated dicarboxylic acid is normally carried out at an elevated temperature. It has been found that gelation becomes significant above about 185° C. It is accordingly preferred to carry out the esterification at temperatures below those at which gelation occurs. It is most preferred to carry out the reaction from about 50° C. to about 180° C.

"Sulfites," as used in the specification and claims, include sulfurous acid, sulfur dioxide and ammonium and metal sulfites. The sulfite adds across the olefinic bond in the residue of the alpha,beta-ethylenically unsaturated dicarboxylic acid at the end of the prepolymer resin to produce sulfonate moieties. Metal sulfites include, but are not limited to, sodium, potassium or lithium sulfite, metabisulfite or bisulfite. However, for ease of manipulation, the use of sodium sulfite or bisulfite is preferred.

The amount of sulfite is from about 0.5 mol to about 1.5 mol per mole of alpha,beta-ethylenically unsaturated dicarboxylic acid residue at the end of the prepolymer resin. It is preferred to react most of the olefinic unsaturation with the sulfite and to use from about 0.75 mol to about 1.0 mol of sulfite per mol of alpha,beta-ethylenically unsaturated dicarboxylic acid residue.

The sulfite is conveniently added in the form of an aqueous solution and can be added to the reaction mixture in portions. Alternatively, the reaction mixture can be diluted with water and the sulfite can be added as a solid, also in portions.

The reaction between the ethylenically unsaturated dicarboxylic acid residue and the sulfite is exothermic. It is preferred to control the temperature between about 50° C. and about 100° C.

The compositions of this invention are used as coating or adhesive materials for textile fibers, wood, cardboard, fabrics or paper, as well as for glass or glass fibers. The compositions are soluble in water up to 50-70% solids. The solutions can, therefore, be shipped to a user without need for being dissolved at the work site.

Water solutions of the compositions are particularly useful in coatings for cardboard or paperboard of the type used in making boxes and containers. The compositions can be admixed with a crosslinking agent, e.g. melamine resin or glycidyl ether resin precursors, such as bisphenol A diglycidyl ether, and applied to boxboard stock in conventional ways. The coatings can also contain pigments, e.g., clay, or colorants. The coated boxboard can be dried, for example at 150° C. in a conventional boxboard machine, to give hard bright coatings, which have good ink absorbence, water resistance, abrasion resistance and burst resistance. The coated cartons do not smear during printing.

The solid resins, broken up into a powder, can be mixed with starch and used in powder coating applications.

Aqueous solutions of the resins can be used as adhesives, for example, in making paper boxes or in making furniture. For these applications, solutions containing 10-50% by weight of solids are preferred.

Sizing compositions can be made and applied to paper in a size press. The paper sheet is semi-dried and is run through the dam of a sizing solution at high speed. The paper is then run through press rolls under a high nip pressure and the treated sheet is dried under a dryer. Surface sizing is often considered superior to internal sizing because most of the sizing solution is retained on the paper. Compositions for this purpose preferably contain 5-25% by weight of solids.

The sulfonated polyester resins of this invention can be added to conventional liquid or solid detergent compositions, in which the resins act as soil release agents, particularly as soil release agents for polyester fabrics and articles. The detergent compositions will contain otherwise conventional ingredients, including, but not limited to, a sulfonated detergent, detergent builders, optical brighteners, noionic detergents or the like. The detergent compositions will contain 0.5-20% by weight of sulfonated polyester resins.

BEST MODE FOR CARRYING OUT THE INVENTION

Most preferred sulfonated polyester resins are those wherein from about 0.25 mol to about 0.50 mol of alpha,beta-ethylenically unsaturated dicarboxylic acid is reacted with each 100 g of prepolymer resin at a temperature from about 50° C. to about 180° C. and the thus-produced resin, terminated by a residue of an alpha,beta-ethylenically unsaturated dicarboxylic acid, is reacted with about 0.90 mol to about 1.00 mol of sulfite per mol of alpha,beta-ethylenically unsaturated dicarboxylic acid residue at a temperature maintained from about 50° C. to about 100° C.

Without further elaboration it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the following examples, the temperatures are set forth uncorrected in degrees Celsius. Unless otherwise indicated, all parts and percentages are by weight.

EXAMPLE 1

Preparation of Water-soluble Resin from Scrap Polyethylene Terephthalate

The following ingredients are used:

| parts by weight | |
|---|---|
| 19.05 | diethylene glycol |
| 5.04 | neopentyl glycol |
| 2.18 | pentaerythritol |
| 11.01 | ethoxylated glycerine (17-19 moles of ethylene oxide, molecular weight 850, Witco Chemical Co., Witconol 4073) |
| 0.08 | monobutyl stannoic acid |
| 30.47 | scrap polyethylene terephthalate |
| 25.87 | isophthalic acid |
| 6.2 | trimellitic anhydride |
| 0.1 | tetrapropyl titanate |

The alcohols are charged to a reaction vessel and heated to 200° C. to remove water. Titanate catalyst is charged to the hot alcohol mixture, after which PET is added in three batches. The initial third of the PET is added to the alcohols at 200° C., whereupon the temperature in the reactor is increased to 240° C. and maintained at 240° C. for 15 min. Half of the remaining PET is added and the temperature is kept at 240° C. for 15 min more, after which the remaining third of the PET is added. The temperature in the reactor is kept at 240° C. until a 15-minute clear peel is obtained.

Clear peel time is determined by placing a drop of the reaction mixture on a Petri dish and starting a timer. The time at which the drop becomes opaque is the limit of the clear peel.

When the 15-minute clear peel is obtained, the temperature in the reactor is reduced to 185° C. and monobutyl stannoic acid and then isophthalic acid are charged to the reactor. The resulting mixture is heated until an acid value of 15-20 is obtained. The resulting mixture is cooled to 180° C. and the trimellitic anhydride is charged to the reactor. At the end of 30 minutes, all of the trimellitic anhydride has reacted. The resulting resinous mixture is cooled and chopped up.

EXAMPLE 2

Preparation of Water-soluble Resin from Scrap Polybutylene Terephthalate

The following materials are used:

| parts by weight | |
|---|---|
| 20.0 | triethylene glycol |
| 5.0 | neopentyl glycol |
| 2.5 | trimethylolpropane |
| 11.5 | ethoxylated trimethylolpropane (10 moles of ethylene oxide) |
| 0.1 | monohexyl stannoic acid |
| 29.5 | scrap polybutylene terephthalate |
| 30.0 | isophthalic acid |
| 1.0 | tetra(isopropyl) titanate |

The PBT is broken down as in Example 1 to produce a resinous prepolymer material.

EXAMPLE 3

Preparation of Water-soluble Resin from Scrap Poly(cyclohexanedimethanol Terephthalate)

The following ingredients are used:

| parts by weight | |
|---|---|
| 25.0 | ethylene glycol |
| 20.0 | ethoxylated pentaerythritol (15 moles of ethylene oxide) |
| 30.0 | scrap poly(cylohexanedimethanol terephthalate) |
| 24.8 | isophthalic acid |
| 0.2 | tetrabutyl titanate |

The procedure of Example 1 is followed. The resinous product obtained is chopped up.

EXAMPLE 4

Preparation of Water-soluble Resin from Scrap Polyethylene Terephthalate

The following ingredients are used:

| parts by weight | |
|---|---|
| 11.0 | diethylene glycol |
| 21.55 | cyclohexanedimethanol |
| 30.0 | scrap polyethylene terephthalate |
| 0.08 | monobutyl stannoic acid |
| 3.91 | polyethylene glycol (Pluracol PEG 4000) |
| 0.1 | tetrapropyl titanate |
| 23.36 | isophthalic acid |
| 10.0 | trimellitic anhydride |

The glycols are charged to a reactor and heated to 200° C. to remove water.
Titanate catalyst is charged to the reactor, after which one third of the PET is added and the temperature in the reactor is raised to 240° C. After 15 minutes' heating at this temperature, half of the remaining PET is charged to the reactor. After 15 minutes more, the rest of the PET is added. The temperature in the reactor is kept at 240° C. until a 15-minute clear peel is obtained.

The temperature in the reactor is dropped to 185° C. Monobutyl stannoic acid is charged to the reactor, followed by the isophthalic acid. The mixture in the reactor is cooked until an acid value of 15-20 is obtained. The temperature may be raised to 220° C. during this step. The resulting product is cooled to 180° C. and the trimellitic anhydride is added. After 1 hr at this temperature, all of the trimellitic anhydride has reacted. The resulting resin is chopped up.

EXAMPLE 5

Preparation of Water-soluble Resin from Scrap Poly(Cyclohexanedimethanol Terephthalate)

The following ingredients are used:

| parts by weight | |
|---|---|
| 20.0 | tetraethylene glycol |
| 0.1 | monobutyl stannoic acid |
| 0.1 | tetrabutyl titanate |
| 40.0 | scrap poly(cyclohexanedimethanol terephthalate) |
| 35.0 | isophthalic acid |
| 3.0 | trimellitic anhydride |

A resin is prepared as in Example 4. The hot resin is cooled and broken up.

EXAMPLE 6

Preparation of Water-soluble Resin from Scrap Polybutylene Terephthalate

The following materials are used:

| parts by weight | |
|---|---|
| 15.0 | ethylene glycol |
| 12.0 | neopentyl glycol |
| 40.0 | scrap PBT |
| 32.0 | isophthalic acid |
| 0.1 | monobutyl stannoic acid |
| 0.1 | tetrapropyl titanate |

The resinous product, obtained as in Example 4, is chopped up.

EXAMPLE 7

Preparation of Water-soluble Resin from Scrap Polyethylene Terephthalate

The following materials are used:

| parts by weight | |
|---|---|
| 30 | diethylene glycol |
| 10 | pentaerythritol |
| 20 | ethoxylated glycerol (7-9 EO units) |
| 40 | scrap PET |
| 0.08 | monobutyl stannoic acid |
| 0.1 | tetrabutyl titanate |

The alcohols are charged to a reaction vessel and heated to 200° C. to remove water. Titanate catalyst is charged to the hot alcohol mixture, after which PET is added in three batches. The initial third of the PET is added to the alcohols at 200° C., whereupon the temperature in the reactor is increased to 240° C. and kept at 240° C. for 15 min. Half of the remaining PET is added and the temperature is kept at 240° C. for 15 min more, after which the rest of the PET is added. Heating at 240° C. is continued for about 15 min more.

The resulting resin is broken up.

EXAMPLE 8

Sulfonation of Polyester Resin (a) A mixture of 151.2 g of prepolymer resin, prepared as in Example 1, 37.6 g of maleic anhydride (0.385 mol), 36.0 of sodium metabisulfite (0.189 mol) and 225 g of water are used. The prepolymer and maleic anhydride are charged to a round-bottom flask, fitted out with a reflux condenser, Dean-Stark trap, stirrer and thermometer. The mixture is heated as follows:

| Time | Temp. | Observations |
| --- | --- | --- |
| 9:30 | room | charge materials |
| 9:45 | 165° C. | exotherm, mixture clear |
| 10:10 | 165° C. | add 0.25 g. of Fascut 200 water evolution begins |
| 10:20 | 185° C. | water evolution is too fast |
| 10:35 | 185° C. | water evolution continues |
| 11:30 | 185° C. | acid value = 37.0 |
| 12:00 | 185° C. | gelation occurring, stop experiment |

(b) A similar reaction is performed using 48.6 g of sodium sulfite (0.376 mol).

| Time | Temp | Observations |
| --- | --- | --- |
| 2:00 | 160° C. | heat prepolymer and maleic anhydride |
| 2:15 | 90° C. | add sodium sulfite (solution in 225 g of water), the reaction mixture becomes clear |
|  | 90° C. | continue heating |

The pH of the resulting product is 5.8.

(c) A similar reaction is done, using as reactants 107.1 g of prepolymer of Example 1, 18.9 g of isophthalic acid, 36.9 g of maleic anhydride (0.376 mol), 47.1 g of sodium sulfite (0.373 mol) and 90.0 g of water.

| Time | Temp. | Observations |
| --- | --- | --- |
| 11:00 | room | charge prepolymer and isophthalic acid |
| 11:15 | 210° C. | mixture clear, no water evolution |
| 11:30 | 225° C. | cool mixture |
| next day |  |  |
| 9:45 | 80° C. | charge maleic anhydride and drop temperature |
| 10:20 | 50° C. | maleic anhydride dissolves |
| 10:30 | 80° C. | exothermic reaction to about 120° C. |
| 11:00 | 100° C. | mixture appears tackier; add water |
|  | 62° C. | add part of sodium sulfite |
| 11:10 | 80° C. | exothermic reaction |
| 11:14 | 75° C. | mixture becomes clearer after ¾ of sodium sulfite added |
| 11:25 | 95° C. | heat at end of sodium sulfite additon |
| 11:40 | 40° C. | cool to room temperature. |

The product is clear amber, viscosity, 1,960 cps.

(d) A similar reaction is done, using as reactants 96.0 g of prepolymer of Example 1, 30.0 g of isophthalic acid, 36.9 g of maleic anhydride (0.376 mol), 47.1 g of sodium sulfite (0.373 mol) and 90.0 g of water.

| Time | Temp. | Observations |
| --- | --- | --- |
| 1:30 | room | add isophthalic acid to prepolymer |
| 1:45 | 200° C. | water evolving |
| 1:55 | 230° C. | water evolving rapidly, polymer clearing |
| 2:07 | 240° C. | water evolution slowing |
| 2:30 | 100° C. | begin maleic anhydride addition |
| 2:37 | 80° C. | begin gentle heating |
| 2:45 | 130° C. | exotherm weaker |
| 4:45 | 100° C. | add water |
| 4:47 | 60° C. | add portion of sodium sulfite |
| 5:00 | 90° C. | strong exotherm, requires cooling |
| 5:05 | 90° C. | continue heating, complete addition of sodium sulfite |

The product (70% solids) is completely clear and water thin at 25° C.

The solution is placed in an oven at 70° C. After 13 days' standing, the solution becomes noticeably more viscous; after 15 days' standing, solids separate.

(e) A similar reaction is done, first chain extending a prepolymer of Example 1 (217.14 g, 96% real) with 82.86 g of isophthalic acid. Smaller amounts of maleic anhydride and sodium sulfite are used, than in the foregoing examples. The extended polymer (180 g), 13.6 g of maleic anhydride (0.138 mol), 12.8 g of sodium sulfite (0.101 mol) and 256.4 g of water are used.

| Time | Temp. | Observations |
| --- | --- | --- |
| 9:00 | 90° C. | add isophthalic acid to prepolymer and heat |
| 10:00 | 200° C. | water evolution; theoretical amount is collected |
| 1:15 | 90° C. | 100 g of resin is removed, 180. g is further reacted |
| 1:30 | 120° C. | add maleic anhydride, hold temp. at 130° C. |
| 2:00 | 70° C. | add water (206.4 g) and sulfite, owing to the high viscosity of the product, add 50 g of water to give a thin emulsion |

This experiment shows that small amounts of maleic anhydride and sulfite do not give a sufficiently water-soluble product.

(f) Isophthalic acid chain-extended prepolymer of (e) (95.0 g) is reacted with 28.46 g of maleic anhydride (0.290 mol), 35.65 g of sodium sulfite (0.283 mol) and 159.31 g of water.

| Time | Temp. | Observations |
| --- | --- | --- |
| 10:30 | room | heat chain-extended prepolymer to 100° C. |
| 10:40 | 100° C. | add maleic anhydride and heat |
| 10:45 | 135° C. | hold for 30 min |
| 10:50 | 150° C. | temp. rise |
| 10:55 | 100° C. | add water and sodium sulfite |
| 11:00 | 50° C. | exotherm begins |
| 11:05 | 70° C. | mixture clarifies, exotherm maximum is 74° C. |
| 11:10 | 90° C. | mixture thins at about 80° C.; hold at 90° C. for 10 min and cool. |

The resulting material (50% solids) is clear and fluid at room temperature.

(g) Prepolymer of Example 1 (244 g) is reacted with 45 g of isophthalic acid, 55.35 g of maleic anhydride (0.564 mol), 70.65 g of sodium sulfite (0.560 mol) and 135 g of water.

| Time | Temp. | Observations |
| --- | --- | --- |
| 9:30 | room | charge prepolymer, add isophthalic acid and begin heating |
| 9:37 | 185° C. | Water evolution begins |
| 9:45 | 234° C. | product clear; 4 mL of water collects |
| 9:55 | 244° C. | more than 10 mL of water collects, water evolution slows |
| 10:10 | 240° C. | stop heating, acid value = 16.8, 12 mL of water collects (9.75 mL theor) |
| 10:45 | 80° C. | add maleic anhydride |
| 11:00 | 150° C. | heat to complete reaction of maleic anhydride |
| 11:20 | 110° C. | add water, cool to 70° C. |
| 11:24 | 70° C. | start addiiton of sodium sulfite |
| 11:30 | 95° C. | solution clarifies before all sodium sulfite |

-continued

| Time | Temp. | Observations |
|---|---|---|
| | | is added |

EXAMPLE 9

Preparation of Resin from Scrap Polyethylene Terephthalate and After-treatment with Maleic Anhydride and Sodium Sulfite (a) Scrap polyethylene terephthalate (299.6 g) is broken down by alcoholysis with diethylene glycol (150 g) and pentaerythritol (50 g), using 0.4 g of tetraisopropyl titanate catalyst in alcohol.

| Time | Temp. | Observations |
|---|---|---|
| 10:15 | 200° C. | heat glycols to remove water, add catalyst and then 99.8 g of PET scrap |
| 10:30 | 230° C. | PET fusing in reactor |
| 10:35 | 235° C. | reactor contents clearing, some insolubles remain |
| 10:40 | 240° C. | add 99.8 g of PET scrap |
| 10:55 | 243° C. | clear mixture, distillate evolving rapidly |
| 11:05 | 243° C. | 12 mL of distillate collects, good clear peel |
| 11:15 | 240° C. | add 50 g of PET |
| 11:30 | 243° C. | clear peel, remove 150 g of material 12 mL of distillate |
| 1:15 | 80° C. | heat and add 50 g of PET |
| 1:40 | 234° C. | foams and clears, add defoamer |
| next day | | |
| 9:20 | 234° C. | add 50 g of PET, hold 1 h, 3 h clear peel |

(b) Resin product from (a) (150.0 g) is reacted with 43.93 g of maleic anhydride (0.448 mol), 56.05 g of sodium sulfite (0.445 mol) and 107.1 g of water.

| Time | Temp. | Observations |
|---|---|---|
| 11:00 | 100° C. | add maleic anhydride to resin |
| 11:15 | 150° C. | hold for 30 min to complete reaction of maleic anhydride |
| 1:30 | 100° C. | add water |
| 1:33 | 74° C. | add half of sodium sulfite |
| 1:36 | 89° C. | slight exotherm, cool mixture |
| 1:39 | 85° C. | add remainder of sodium sulfite |

The product (70% solids) is very viscous. Dilution with 59.5 g of water (60% solids) gives a somewhat less viscous product. Dilution with 83.3 g of water (50% solids) results in a less viscous, clear solution, which slowly becomes hazy.

(c) Resin from (a) (76.0 g) is reacted with 33.4 g of maleic anhydride (0.340 mol), 42.5 g of sodium sulfite (0.337 mol) and 65.1 g of water.

| Time | Temp. | Observations |
|---|---|---|
| 3:15 | room | charge resin |
| 3:20 | 100° C. | charge maleic anhydride |
| 3:25 | 150° C. | all maleic anhydride reacts |
| 3:35 | 150° C. | begin cooling |
| 3:45 | 100° C. | add water |
| 3:47 | 70° C. | add half of sodium sulfite |
| 3:53 | 90° C. | stronger exotherm, cool mixture |
| 3:57 | 85° C. | add remainder of sodium sulfite |
| 4:05 | 92° C. | heat to complete reaction |

The product (70% solids) is clear initially and becomes hazy on standing at room temperature.

(d) Resin from (a) (140.0 g) is reacted with 42 g of maleic anhydride (0.428 mol), 52.5 g of sodium sulfite (0.416 mol) and 234.5 g of water to give a product, containing 50.0% by weight of solids.

| Time | Temp. | Observations |
|---|---|---|
| 3:45 | 120° C. | add maleic anhydride to resin |
| 3:55 | 130° C. | hold to complete reaction with anhydride |
| 4:15 | 110° C. | add water |
| 4:20 | 60° C. | add half of sodium sulfite |
| 4:25 | 78° C. | exothermic reaction, add remainder of sodium sulfite with cooling |
| 4:30 | 78° C. | exothermic reaction stops, product not completely clear |
| 5:00 | 40° C. | product translucent |
| next day | | product cloudier, very mobile |

EXAMPLE 10

Reaction of Prepolymers with Isophthalic Acid, Maleic Anhydride and Sodium Sulfite (a) Prepolymer of Example 1 (115.38 g) is reacted with 45.81 g of isophthalic acid, 48.33 g of maleic anhydride (0.492 mol), 60.43 g of sodium sulfite (0.479 mol) and 180.00 g of water in a three-neck round-bottom flask, fitted out with stirrer, Dean-Stark water trap, condenser, thermometer with thermowatch and heating mantle.

| Time | Temp. | Observations |
|---|---|---|
| 10:35 | room | charge prepolymer and isophthalic acid |
| 10:48 | 180° C. | water evolving |
| 11:00 | 230° C. | product clear, water evolving rapidly, 3–4 mL |
| 11:50 | 234° C. | 9 mL of water collected, acid no = 21.5 |
| 1:45 | 90° C. | add maleic anhydride |
| 1:55 | 150° C. | heat to complete reaction of maleic anhydride |
| 2:00 | 165° C. | turn off heating |
| 2:45 | 100° C. | add water |
| 2:50 | 60° C. | add half of sodium sulfite |
| 2:55 | 75° C. | add remainder of sodium sulfite, dilute highly viscous solution with 90 g of water (to 50% solids) |
| 4:00 | 45° C. | cool to room temperature, pH 4.5, sulfite smell strong, reheat to 90° C. for 15 min to remove sulfite. |

Addition of 100 g of 10% KOH solution to 400 g of 50% product reduces the pH to 5.0.

(b) Prepolymer (115.38 g) of Example 1, 45.81 g of isophthalic acid, 48.33 g of maleic anhydride (0.492 mol), and 60.48 g of sodium sulfite (0.480 mol) in 180.00 g of water are reacted.

| Time | Temp. | Observations |
|---|---|---|
| 9:45 | room | charge prepolymer and isophthalic acid |
| 10:00 | 200° C. | water evolving |
| 10:11 | 238° C. | mixture clear |
| 10:30 | 242° C. | 10 mL of water collects, acid value = 16.8 |
| 11:30 | 70° C. | add maleic anhydride and heat to 150° C. |
| 11:36 | 150° C. | exotherm to 162° C. |
| 1:30 | 110° C. | add small increments of water, no large increase is viscosity |
| 1:35 | 65° C. | thickens below about 75° C. |
| 1:42 | 75° C. | product flows more readily |
| 1:45 | 75° C. | add half of sodium sulfite, exotherm to 80° C. |
| 1:48 | 80° C. | add remainder of sodium sulfite, exotherm to 95° C., acid value = 43.2 |
| 2:40 | 78° C. | acid value = 40.8 |

Adding 5 g of KOH to 100 g of this solution (60% solids) does not affect its solubility or viscosity.

EXAMPLE 11

Reactions are run as in Example 9, using the following starting materials:

| (a) | 100.0 | solid prepolymer of Example 4 |
|---|---|---|
|   | 34.8 | fumaric acid |
|   | 31.2 | sodium bisulfite |
|   | 80.0 | water |
| (b) | 100.0 | solid prepolymer of Example 6 |
|   | 38.0 | maleic acid |
|   | 37.8 | sodium sulfite |
|   | 90.0 | water |
| (c) | 100.0 | solid polymer of Example 1 |
|   | 40.0 | itaconic acid |
|   | 35.0 | ammonium sulfite |
|   | 100.0 | water |
| (d) | 100.0 | solid prepolymer of Example 4 |
|   | 35.0 | citraconic acid |
|   | 35.0 | sodium sulfite |
|   | 100.0 | water |
| (e) | 100.0 | solid prepolymer of Example 4 |
|   | 30.0 | isophthalic acid |
|   | 37.0 | maleic acid |
|   | 41.0 | sodium sulfite |
|   | 95.0 | water |

Similar results are obtained.

EXAMPLE 12

The product of Example 9(c) (25 parts) is mixed with 10 parts of curing agent (50% melamine), 100 parts of clay and 40 parts of titanium dioxide pigment and applied as a coating on cardboard boxing stock. The coated stock is cured at 150°-210° C. in a conventional board coating machine to give a hard, bright coating, which is readily printed and cut into forms for soft-drink bottle carriers. The coated cartons have acceptable ink absorbence, water resistance, abrasion resistance, burst resistance and do not smear during printing.

EXAMPLE 13

The product of Example 10(a) is dried to 95% solids content and chopped to a powder. The powder is blended with isocyanates or melamine (10-50% by weight) and used as a powder coating for priming metal surfaces.

EXAMPLE 14

The products of Examples 9 and 10 are used, after dilution with water to solids levels of 30-75%, as adhesives for labels, boxboard, wood or furniture. Good results are obtained.

EXAMPLE 15

(a) Liquid Detergent

Liquid detergent is formulated from 15% by weight of sodium lauryl sulfate, 10% by weight of sodium carbonate, 2% by weight of optical brightener and 5% by weight of a resin of Example 9(b), the balance being water. The detergent is used in a standard washing machine for washing polyester garments and imparting soil release properties thereto.

(b) Solid Detergent

Detergent is formulated from 45% by weight of sodium alkylbenzene sulfonates, 43% by weight of sodium carbonate, 3% by weight of optical brightener, and 9% by weight of a product of Example 10(a) (95% solids). The detergents are used in a standard washing machine for washing polyester clothing articles and imparting soil release properties thereto.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

I claim:

1. A sulfonated water soluble or water-dispersible polyester resin, comprising a reaction product of 20-50% by weight of terephathlate polymer, 10-40% by weight of at least one glycol and 5-25% by weight of at least one oxyalkylated polyol to produce a prepolymer resin having hydroxyalkyl functionality, wherein the prepolymer resin is further reacted with about 0.10 mole to about 0.50 mole of an alpha, beta unsaturated dicarboxylic acid per 100 g of prepolymer resin and a thus produced resin, terminated by a residue of an alpha, beta-ethylenically unsaturated dicarboxyclic acid, is reacted with about 0.5 mole to about 1.5 mole of a sulfite per mole of alpha, beta-ethylenically unsaturated dicarboxylic acid residue to produce a sulfonated-terminated resin.

2. The sulfonated polyester resin of claim 1, wherein from about 0.25 mol to about 0.50 mol of alpha,beta-ethylenically unsaturated dicarboxylic acid is reacted with each 100 g of prepolymer resin at an elevated temperature such that gelation does not occur.

3. The sulfonated polyester resin of claim 1, wherein from about 0.25 mol to about 0.50 mol of alpha,beta-ethylenically unsaturated dicarboxylic acid is reacted with each 100 g of prepolymer resin at a temperature from about 50° C. to about 180° C.

4. The sulfonated polyester resin of claim 1, wherein the thus-produced prepolymer resin, terminated by a residue of an alpha,beta-ethylenically unsaturated dicarboxylic acid, is reacted with about 0.75 mol to about 1.00 mol of a sulfite per mol of alpha,beta-ethylenically unsaturated dicarboxylic acid residue.

5. The sulfonated polyester resin of claim 1, wherein the thus-produced prepolymer resin, terminated by a residue of an alpha,beta-ethylenically unsaturated dicarboxylic acid, is reacted with about 0.90 mol to about 1.00 mol of a sulfite per mol of alpha,beta-ethylenically unsaturated dicarboxylic acid residue at a temperature maintained from about 50° C. to about 100° C.

6. The sulfonated polyester resin of claim 1, wherein from about 0.25 mol to about 0.50 mol of alpha,beta-ethylenically unsaturated dicarboxylic acid is reacted with each 100 g of prepolymer resin at a temperature from about 50° C. to about 180° C. and the thus-produced resin, terminated by a residue of an alpha,beta-ethylenically unsaturated dicarboxylic acid, is reacted with about 0.90 mol to about 1.00 mol of a sulfite per mol of alpha,beta-ethylenically unsaturated dicarboxylic acid residue at a temperature maintained from about 50° C. to about 100° C.

7. The sulfonated polyester resin of claim 1, comprising a reaction product also containing 20-50% by weight of isophthalic acid.

8. The sulfonated polyester resin of claim 1, comprising a product of further reaction with 3-15% by weight of trimellitic acid or trimellitic anhydride.

9. The sulfonated polyester resin of claim 1, comprising the reaction product of waste terephthalate of the unit formula

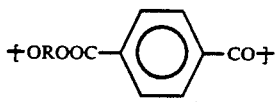

wherein R is the residue of an aliphatic or cycloaliphatic glycol of 2-10 carbons or of an oxygenated glycol of the formula $HO(C_xH_{2x}O)_nC_xH_{2x}OH$, wherein x is an integer from 2-4 and n is 1-10.

10. The sulfonated polyester resin of claim 1, wherein the terephthalate polymer is waste polyethylene terephthalate, polybutylene terephthalate, poly(cyclohexanedimethanol terephthalate) or a mixture thereof.

11. The sulfonated polyester resin of claim 1, wherein the glycol is ethylene glycol, diethylene glycol, triethylene glycol, cyclohexanedimethanol, propylene glycol, butylene glycol, neopentyl glycol, 1,5-pentanediol, 1,6-hexanediol or a mixture thereof.

12. The sulfonated polyester resin of claim 1, wherein the glycol is a mixture of diethylene glycol and neopentyl glycol.

13. The sulfonated polyester resin of claim 1, wherein the oxyalkylated polyol is glycerol, trimethylolpropane, trimethylolethane, pentaerythritol, erythritol, sorbitol, glucose or methylglucoside, oxyalkylated with 5-30 moles of ethylene oxide, propylene oxide or a mixture thereof, per hydroxyl of the polyol.

14. The sulfonated polyester resin of claim 1, further comprising 1-10% by weight of a polyol.

15. The sulfonated polyester resin of claim 7, comprising a reaction product of 20-50% by weight of polyethylene terephthalate, 10-30% by weight of diethylene glycol, 1-10% by weight of pentaerythritol, 5-25% by weight of oxyalkylated glycerol of 5-30 oxyalkyl units per hydroxyl, 20-50% by weight of isophthalic acid and 3-15% by weight of trimellitic acid or trimellitic anhydride.

16. The sulfonated polyester resin of claim 7, comprising a reaction product of 25-40% by weight of polyethylene terephthalate, 20-30% by weight of diethylene glycol, 1-10% by weight of pentaerythritol, 5-15% by weight of oxyethylated glycerine having 5-30 oxyethylene units per hydroxyl, 20-30% by weight of isophthalic acid and 5-10% by weight of trimellitic acid or trimellitic anhydride.

17. The sulfonated polyester resin of claim 7, wherein from about 0.25 mol to about 0.50 mol of alpha,beta-ethylenically unsaturated dicarboxylic acid is reacted with each 100 g of prepolymer resin at an elevated temperature such that gelation does not occur.

18. The sulfonated polyester resin of claim 7, wherein the thus-produced resin, terminated by a residue of an alpha,beta-ethylenically unsaturated dicarboxylic acid, is reacted with about 0.75 mol to about 1.00 mol of sulfite per mol of alpha,beta-ethylenically unsaturated dicarboxylic acid residue.

19. The sulfonated polyester resin of claim 7, wherein from about 0.25 mol to about 0.50 mol of alpha,beta-ethylenically unsaturated dicarboxylic acid is reacted with each 100 g of prepolymer resin at a temperature from about 50° C. to about 180° C. and the thus-produced resin, terminated by a residue of an alpha,beta-ethylenically unsaturated dicarboxylic acid, is reacted with about 0.90 mol to about 1.00 mol of sulfite per mol of alpha,beta-ethylenically unsaturated dicarboxylic acid residue at a temperature maintained from about 50° C. to about 100° C.

20. Textile fiber, fabric, paper, cardboard, wood, glass or glass fiber, coated with the sulfonated polyester resin of claim 6.

21. Textile fiber, fabric, paper, cardboard, wood, glass or glass fiber, coated with the sulfonated polyester resin of claim 19.

22. A sulfonated polyester resin, comprising a reaction product of 20-50% by weight of a terephthalate polymer, 10-50% by weight of at least one glycol and 20-50% by weight of isophthalic acid to produce a prepolymer resin, wherein the prepolymer resin is further reacted with about 0.10 mol to about 0.50 mol of an alpha,beta-ethylenically unsaturated dicarboxylic acid per 100 g of prepolymer resin and a thus-produced resin, terminated by a residue of an alpha,beta-ethylenically unsaturated dicarboxylic acid is reacted with about 0.5 mol to about 1.5 mol of a sulfite per mol of alpha,beta-ethylenically unsaturated dicarboxylic acid residue to produce a sulfonate-terminated resin.

23. The sulfonated polyester resin of claim 22, wherein from about 0.25 mol to about 0.50 mol of alpha,beta-ethylenically unsaturated dicarboxylic acid is reacted with each 100 g of prepolymer resin at an elevated temperature such that gelation does not occur.

24. The sulfonated polyester resin of claim 22, wherein the thus-produced resin, terminated by a residue of an alpha,beta-ethylenically unsaturated dicarboxylic acid, is reacted with about 0.75 mol to about 1.00 mol of sulfite per mol of alpha,beta-ethylenically unsaturated dicarboxylic acid residue.

25. The sulfonated polyester resin of claim 22, wherein from about 0.25 mol to about 0.50 mol of alpha,beta-ethylenically unsaturated dicarboxylic acid is reacted with each 100 g of prepolymer resin at a temperature from about 50° C. to about 180° C. and the thus-produced resin, terminated by a residue of an alpha,beta-ethylenically unsaturated dicarboxylic acid, is reacted with about 0.90 mol to about 1.00 mol of sulfite per mol of alpha,beta-ethylenically unsaturated dicarboxylic acid residue at a temperature maintained from about 50° C. to about 100° C.

26. The sulfonated polyester of claim 22, comprising a product of further reaction with 3-15% by weight of trimellitic acid or trimellitic anhydride.

27. The sulfonated polyester resin of claim 22, comprising a reaction product of a waste terephthalate of the unit formula

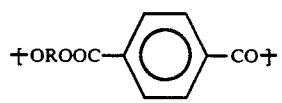

wherein R is the residue of an aliphatic or cycloaliphatic glycol of 2-10 carbon atoms or of an oxygenated glycol of the formula $HO(C_xH_{2x}O)_nC_xH_{2x}OH$ wherein x is an integer from 2-4 and n is 1-10.

28. The sulfonated polyester resin of claim 22, wherein the terephthalate is waste polyethylene terephthalate.

29. The sulfonated polyester resin of claim 22, wherein the polyester is waste poly(cyclohexanedimethanol terephthalate).

30. The sulfonated polyester resin of claim 22, wherein the glycol is ethylene glycol, diethylene glycol, triethylene glycol, cyclohexanedimethanol, propylene glycol, butylene glycol, neopentyl glycol, 1,5-pentanediol, 1,6-hexanediol or a mixture thereof.

31. The sulfonated polyester resin of claim 20 wherein the glycol is a mixture of diethylene glycol and cyclohexanedimethanol.

32. The sulfonated polyester resin of claim 22, comprising a reaction product of 20-50% by weight of polyethylene terephthalate, 10-30% by weight of diethylene glycol, 20-50% by weight of isophthalic acid and 3-15% by weight of trimellitic acid or trimellitic anhydride.

33. The sulfonated polyester resin of claim 22, comprising a reaction product of 20-50% by weight of poly(cyclohexanedimethanol terephthalate), 10-30% by weight of diethylene glycol, 20-50% by weight of isophthalic acid and 3-15% by weight of trimellitic acid or trimellitic anhydride.

34. The sulfonated polyester resin of claim 20, comprising a reaction product of 20-40% by weight of polyethylene terephthalate, 15-25% by weight of diethylene glycol, 20-30% by weight of isophthalic acid and 3-15% by weight of trimellitic acid or trimellitic anhydride.

35. Textile fiber, fabric, paper, cardboard, wood, glass or glass fiber, coated with the sulfonated polyester resin of claim 22.

36. Textile fiber, fabric, paper, cardboard, wood, glass or glass fiber, coated with the sulfonated polyester resin of claim 25.

37. Solid or liquid detergent, containing 0.5-20% by weight of a sulfonated polyester resin of claim 6.

38. Solid or liquid detergent, containing 0.5-20% by weight of a sulfonated polyester resin of claim 19.

39. Solid or liquid detergent, containing 0.5-20% by weight of a sulfonated polyester resin of claim 22.

40. Solid or liquid detergent, containing 0.5-20% by weight of a sulfonated polyester resin of claim 25.

* * * * *